WITNESSES
Theodore F. Wrobel
James F. Young

INVENTOR
Charles F. Ter Bush
BY Edward C. Arenz
ATTORNEY

Sept. 6, 1966 C. F. TER BUSH 3,270,513

THERMOELECTRIC WATER COOLER

Filed June 21, 1965 2 Sheets-Sheet 2

United States Patent Office 3,270,513

Patented Sept. 6, 1966

3,270,513
THERMOELECTRIC WATER COOLER

Charles F. Ter Bush, Grove City, Ohio, assignor to Westinghouse Electric Corporation, Pittsburgh, Pa., a corporation of Pennsylvania Filed June 21, 1965, Ser. No. 465,342
7 Claims. (Cl. 62—3)

This invention relates to thermoelectric water coolers.

One favored application of thermoelectric water coolers is for railroad service where electrical power is readily available, and reliability in operation is imperative due to work rules regarding the availability of cold water for the train crews. In one typical arrangement of a thermoelectric water cooler for railroad service, the water storage chamber is tightly clamped to the cold shoe of the thermoelectric module by means of a tension band girdling the chamber and having ends secured to the heat sink of the module. With this type of mounting arrangement, the heat sink may be flexed in a direction which causes its central part to be displaced away from the thermocouple portion of the module. This condition frequently leads to failure of the thermoelectric module from overheating of the couples since the bridging straps on the hot sides of the couples cannot conduct the heat to the sink at a sufficiently rapid rate.

Accordingly, the principal object of this invention is the provision of a mounting arrangement which reduces the likelihood of cooler failure due to the heat sink being pulled away from the rest of the module.

Another object is the provision of a mounting arrangement which improves the efficiency of the cooling operation and also lends itself to the spatial limitations encountered in many railroad thermoelectric water coolers.

The nature and substance of the invention will perhaps be better understood in light of a more detailed description of the typical mounting arrangement of the water chamber and thermoelectric module. The water chamber is usually an upright cylindrical tank to which the thermoelectric module is secured by means of a tension band girdling the chamber and having its ends secured to the heat sink of the module at locations spaced outwardly from the sides of the remainder of the module. The module comprises a cold plate or shoe having one face contoured to fit a part of the circular exterior face of the water chamber, and an opposite planar face having the individual thermocouples arrayed thereon. The heat sink is a relatively heavy extended area plate located on the opposite side of the thermocouples from the cold shoe so that the thermocouples are sandwiched between the parallel opposing faces of the cold shoe and the heat sink. The heat sink is provided with heat dissipating means, such as vertically-extending fins, on its outer face. Between the bridging straps connecting the hot sides of the individual thermocouples, and the inner face of the heat sink, a thin film of electrically insulating material, such as a commercially available plastic film having the trade designation "Mylar," is interposed to electrically insulate the thermocouple array from the heat sink. If the heat sink is bowed outwardly in its central part away from the bridging straps, due to the tension band around the water chamber causing flexure of the heat sink, the straps become hotter than desirable in normal operation since the heat transfer between the straps and the sink is reduced. The hot straps can cause holes to be burned through the Mylar film and accordingly the unit module shorts out electrically to the heat sink. This condition can result with the magnitude of the flexure of the heat sink from a completely flat condition being as little as 0.0005 inch at its center.

In accordance with the invention, flexure of the heat sink away from the thermocouple array is prevented by a mounting arrangement in which a compressive force is exerted against the central part of the heat sink and toward the thermocouple array in accordance with the tension produced in the clamping band. Instead of fastening the ends of the band directly to the outer locations of the heat sink, the end fasteners of the band pass freely through these outer locations and engage the ends of a beam plate which is fulcrumed at its central part against the outer face of the sink. Accordingly, as the fasteners are tightened to apply tension to the band, the compressive force is applied through the fulcrum to the outer face of the sink. The fastening arrangement according to the invention lends itself to incorporation in water coolers having relatively tight space limitations by using a beam plate having a slight dihedral in its unstressed condition and which is stressed into a substantially flat shape as its ends yield to the tightening of the fasteners.

The invention will be described in connection with the accompanying drawing illustrating one preferred embodiment incorporating the principles of the invention, and in which.

Figure 1:
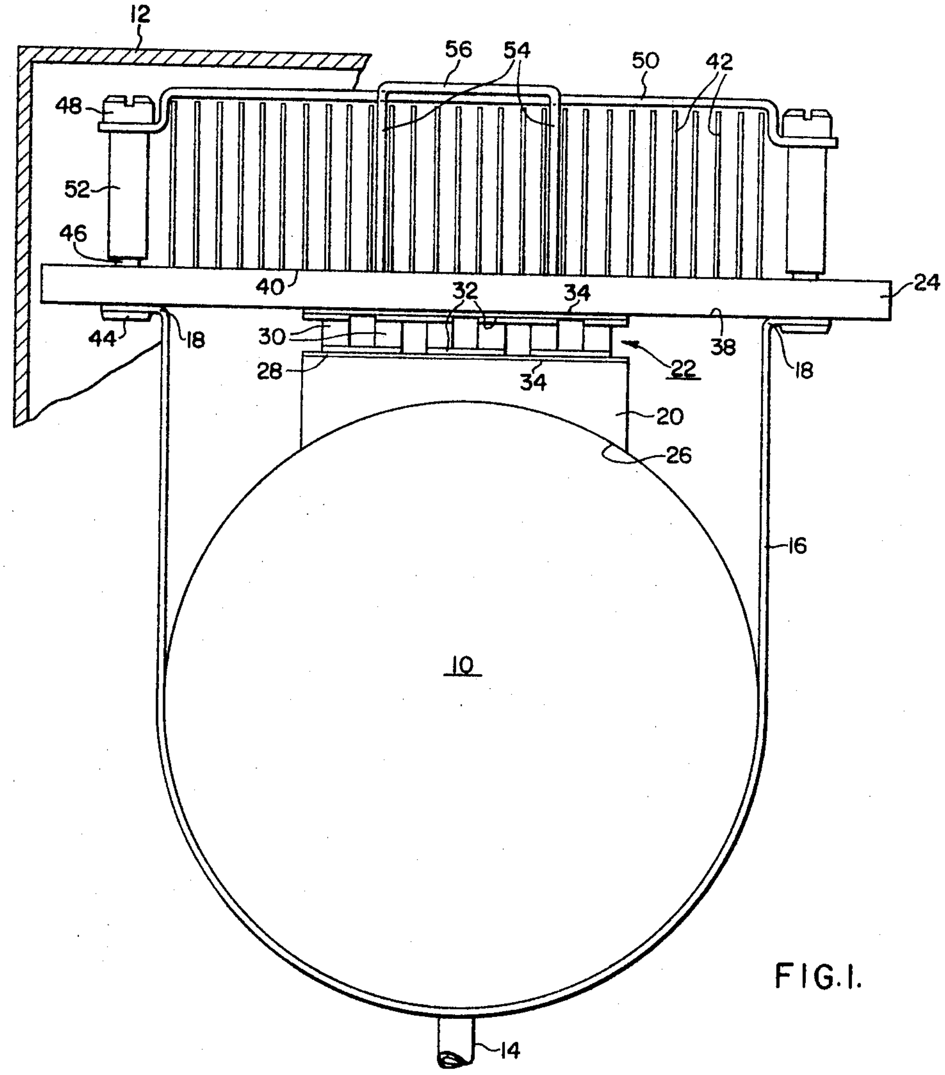
FIGURE 1 is a partly broken top view of a thermoelectric module mounted to a water chamber in accordance with the invention.
Figure 3:
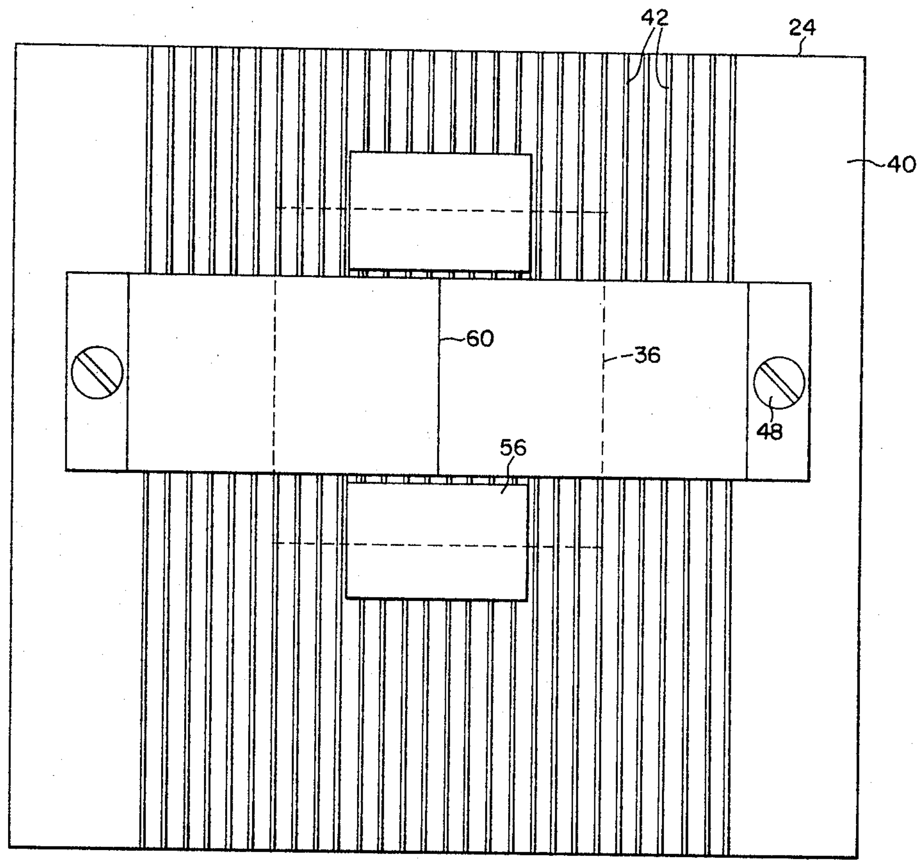
FIG. 3 is an elevational view of the outer face of the heat sink with the beam plate and fulcrum installed.

The water cooler includes a water storage chamber in the form of an upright hollow cylindrical tank 10 (FIG. 1) disposed within an outer casing 12. A front outlet 14 near the bottom of the tank is connected to a spigot (not shown) at the front of the cooler, and the thermoelectric module is secured tightly to the rear face of the tank by a clamping band 16. The clamping band extends around the front circumferential face of the tank in saddle-fashion, and has opposite outwardly flanged ends 18 adapted to be fastened to the thermoelectric module.

The principal parts of the thermoelectric module, as best seen in FIG. 1, are the cold shoe 20, the thermocouple array 22, and the heat sink 24. The thermocouple array is sandwiched between opposing parallel plane faces of the cold shoe and the heat sink.

The cold shoe 20 is of rectangular shape in elevation and includes a front concave face 26 which fits the contour of the tank 10, and a rear planar face 28 against which the cold side of the thermocouple array is pressed.

The thermocouple array 22 includes a number of thermoelectric elements 30 of alternate conductivity types electrically connected in series by copper bridging straps 32 in such a way that direct current passes from the one type to the other type of the material adjacent one face of the array, and from the second to the first type adjacent the other face of the array. Accordingly, the one face of the array (adjacent the cold shoe) becomes cold in operation, while the other face of the array (adjacent the heat sink) becomes hot. The heat from the hot face of the array is conducted to, and dissipated from, the heat sink so that the cold face of the array continues to extract heat from the tank and water therein. Thin films 34 of insulating material, affording electrical insulation but negligible resistance to heat transfer therethrough, are interposed between both the hot face of the couples and the sink, and the cold face of the couples and the shoe. As noted before, the preferred film material is a plastic designated in the trade as "Mylar," although other materials such as ceramics and mica may be used instead.

The heat sink 24 has a substantially greater surface area than the rest of the module by virtue of its greater height and width. The greater width is evident in the top view of FIG. 1, and the greater height is indicated by the projection of the elevational area of the shoe and thermocouple array by the broken line outline 36 of FIG. 2. The sink is a relatively thick, flat plate having a flat planar inner surface 38, and a parallel planar outer surface 40 carrying heat dissipating means such as the fins 42. At least the central portion of the inner face of the heat sink adapted to abut the thermocouple array is held to a close tolerance with respect to flatness to insure uniformity of contact between that part of the heat sink and the thermocouple array.

The thermoelectric module is fastened tightly to the water tank by means of the clamping band 16 which has its ends 18 pulled toward the heat sink 24 along lines spaced outwardly from the side boundaries of the thermocouple array 22 and shoe 20. To insure that the tension in the band does not cause the sink to bow or flex outwardly away from the thermocouple array, the band ends are pulled up by fastener means which engage the ends of a beam plate having a central fulcrum bearing against the sink abutting the thermocouple array.

Figure 2:
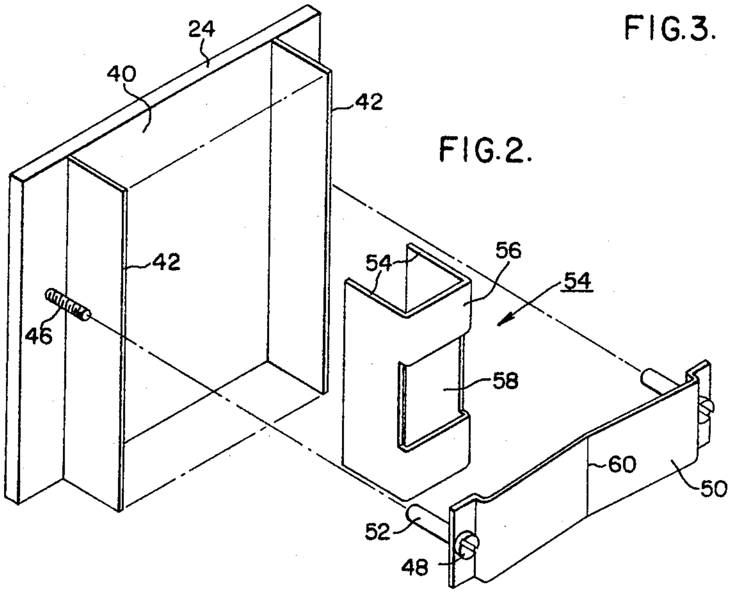
FIG. 2 is an isometric view of the outer face of the heat sink, with the beam plate and fulcrum exploded therefrom.

The fastener means includes a bolt at each end 18 of the band 16, with the bolt head 44 engaging the flanged end of the band, and the bolt shank 46 projecting freely through a hole in the heat sink. A cap nut is provided for each bolt with its head 48 seated on the outer face of the beam plate 50, and its internally threaded shank 52 projecting through a hole in the beam plate generally aligned with the respective hole in the heat sink receiving the bolt. The fulcrum for the beam plate 50 is the channel-shaped part 54 (FIG. 2) and includes opposite legs 54 and a bight 56. The bight 56 has a cut out part 58 which serves as a seat for the beam plate center. The ends of the beam plate are offset or flanged inwardly as best seen in FIGS. 1 and 2 to accommodate the cap nut heads 48 without any substantial increase in the space required within the cabinet 12 of the cooler.

The beam plate 50 is of spring steel or a material having similar sufficiently high elastic limits for flexure. The plate is bent slightly about a vertical centerline 60 so that in its unstressed condition before assembly (FIG. 2) it has a slight dihedral. The fulcrum member 54 serves as the means through which a compressive force is transmitted from the beam plate to the central portion of the outer surface of the heat sink as the fasteners are tightened. The legs 54 of the fulcrum fit in interleafing between the vertically-disposed fins 42 on the outer surface of the heat sink and thus impose negligible resistance to the vertically directed air circulation between the fins.

Partly by way of summary, the mounting of the thermoelectric module to the water tank is accomplished as follows. The band end bolts are extended through the holes in the right angle ends of the clamping band and through the holes at the opposite side margins of the heat sink. The fulcrum member is generally located so that as the beam plate is moved into position, the beam central part seats upon the cut out portion of the bight. The cap nuts are turned down onto the end bolts until the beam plate is flexed to a substantially straightened form. This flexure results in a compressive force being exerted through the fulcrum against the exterior face of the heat sink. The sides of the sink are generally free of any forces tending to bow the sink since the end bolts pass freely through the holes in the sink. It will be appreciated of course that the fulcrum, the bolts, and the cap nuts, and the band are all sized relative to each other so that when the band is placed under adequate tension, the ends of the beam plate have also been flexed inwardly no further than the outer edges of the fins, and the ends of the band do not bear with any appreciable force upon the heat sink and preferably are spaced slightly therefrom.

The specific mounting arrangement described not only avoids the prior art difficulty of heat sink bowing but also provides a positive means of insuring tight and uniform interface contacts in the thermoelectric module. Also by virtue of the compressive force being directed normally to the interface planes of the thermocouple assembly, side thrust forces upon the thermocouples are avoided. Side thrust forces are detrimental because they tend to fracture the brittle thermocouples if side shocks are encountered. Fracturing of the thermocouples from expansion and contraction in normal operation is also minimized by reduction of side thrust stresses.

The provision of the cut out portion in the bight of the yoke not only saves space in the cabinet, but also serves to conveniently locate the plate and fulcrum for delivering the compressive forces relatively uniformly and in the proper areas against the outer surface of the heat sink.

Having described my invention, I claim:

1. Thermoelectric water cooling apparatus comprising:
   - a thermoelectric module including a cold shoe, a heat sink, and an array of thermocouples sandwiched between said shoe and sink;
   - a water tank against which said shoe seats;
   - a tension band in saddle relation about said tank and having ends adapted to be pulled toward points on said sink outside of said thermocouple array;
   - fastener means for pulling said ends toward said sink points to place said band under tension; and
   - means for simultaneously applying a compressive force against the area of said sink aligned with said array, and in the direction of said array, as said fastener means are tightened.

2. Thermoelectric water cooling apparatus comprising:
   - a thermoelectric module including a cold shoe, a heat sink, and an array of thermocouples sandwiched between said shoe and sink;
   - a water tank against which said shoe seats;
   - a tension band in saddle relation about said tank and having ends adapted to be pulled toward points on said sink outside of said thermocouple array;
   - a fastener at each of said points for pulling said band ends up toward said sink to place said band under tension;
   - beam means spanning said fasteners and engaged at each end by one of said fasteners; and,
   - a member extending between the generally central part of said beam means and said sink to apply a compressive force to the generally central part of said sink abutting said array as said fasteners are tightened to place said band under tension.

3. Apparatus according to claim 2 wherein:
   - said beam means includes an inwardly-bowed yieldable leaf spring having its central part bearing against said member.

4. In water cooling apparatus:
   - a water tank;
   - a thermoelectric module including a cold shoe fitted in heat exchange relation to said tank, a thermocouple array, and an extended area heat sink plate sandwiching said array to said cold shoe with its inner face and provided with heat dissipating means on its outer face;
   - a tension band girdling said tank and having opposite ends adapted to be secured to respectively opposite side portions of said sink plate;
   - bolt means for drawing up each of said band ends toward said sink plate;
   - a spring plate extending along the outer face of said dissipating means and having its opposite ends engaged by said bolt means; and
   - a compression member projecting inwardly from the central part of said spring plate and bearing against the outer face of said sink plate to apply a compressive force against the part of said sink plate abutting said array as said bolt means are tightened to apply tension to said band.

5. In an arrangement for clamping a thermoelectric cooling assembly having an extended area heat sink to a water tank;

a tension band in saddle relation about said tank and having ends adapted to be drawn toward said heat sink;

a fastener for drawing each end of said band toward said sink to place said band under tension and press said assembly against said tank;

a beam extending along the opposite face of said heat sink from said tank and having ends engaged by said fasteners; and a fulcrum member disposed between the central part of said beam and said opposite face of said heat sink to impart a force pressing the area of said heat sink engaged by said fulcrum member toward said tank as said fasteners are drawn up to simultaneously place said band under tension.

6. In an arrangement according to claim 5:

said beam comprises a spring plate having a slight dihedral therein in unstressed condition, and adapted to assume a substantially flat shape in a stressed condition.

7. In an arrangement according to claim 6:

said fulcrum member is a generally U-shaped member in cross-section, with the legs thereof bearing against the outer face of said heat sink, and the bight thereof including a removed portion serving as a seat for the central portion of said spring plate.

References Cited by the Examiner

UNITED STATES PATENTS

| | | | |
|---|---|---|---|
| 3,088,289 | 5/1963 | Alex | 62—3 |
| 3,155,157 | 11/1964 | Anderson | 62—3 |
| 3,192,724 | 7/1965 | Cummings | 62—3 |
| 3,227,885 | 1/1966 | Hirai | 62—3 |

WILLIAM J. WYE, *Primary Examiner*.